United States Patent [19]
Rosenzweig et al.

[11] Patent Number: 6,081,810
[45] Date of Patent: Jun. 27, 2000

[54] REPORT DATABASE SYSTEM

[75] Inventors: Michael J. Rosenzweig; Richard A. Altman, both of Flanders; Neil P. Marcous, Mountain Lakes, all of N.J.

[73] Assignee: Electronic Data Systems Corporation, Plano, Tex.

[21] Appl. No.: 09/018,149

[22] Filed: Feb. 3, 1998

[51] Int. Cl.$^7$ .................................................. G06F 17/30
[52] U.S. Cl. ................................ 707/104; 707/9; 707/10
[58] Field of Search ..................... 707/1–10, 100–104, 707/200–206; 395/200.31, 200.42, 200.58, 200.72; 345/340, 333, 342; 709/217, 218, 219

[56] References Cited

U.S. PATENT DOCUMENTS

| | | | |
|---|---|---|---|
| 5,437,024 | 7/1995 | French | 707/10 |
| 5,613,110 | 3/1997 | Stuart | 395/601 |
| 5,664,182 | 9/1997 | Nierenberg et al. | 395/613 |
| 5,802,518 | 9/1998 | Karaev et al. | 707/9 |
| 5,809,266 | 9/1998 | Touma et al. | 345/340 |
| 5,819,271 | 10/1998 | Mahoney et al. | 707/9 |
| 5,862,325 | 1/1999 | Reed et al. | 395/200.31 |
| 5,864,871 | 1/1999 | Kitain et al. | 707/104 |

FOREIGN PATENT DOCUMENTS

WO 95/31789  11/1995  WIPO .............................. G06F 17/60

*Primary Examiner*—Ruay Lian Ho
*Attorney, Agent, or Firm*—L. Joy Griebenow; Baker & Botts L.L.P.

[57] ABSTRACT

A method is described for storing and retrieving reports from a computer database with control of access to the database and to the reports. The reports are stored in a current database (16) for a selected period of time and are stored in a library database (18) on a permanent basis. The reports are provided in a report configuration which has data elements of the same parameter at specified locations according to the report configuration. When a report is received for storage in the database, indices are generated relating data elements of various data parameters to memory location of such data elements in the storage locations of the database. The indices can be used to retrieve portions of the report of interest. Access to the database is controlled by report type, report date, and report segment.

8 Claims, 2 Drawing Sheets

FIG. 1
PLANETARY GEAR COMPANY
ACCOUNTS PAYABLE

| REFERENCE NUMBER | VENDOR | DATE RECEIVED | APPLICATION CODE | AMOUNT | DUE DATE | DATE PAID | CHECK NUMBER | AMOUNT PAID |
|---|---|---|---|---|---|---|---|---|
| 001023 | ACME | 10-12-97 | 043 | 203.14 | 11-12-97 | 11-01-97 | 43781 | 203.14 |
| 001024 | SMITH | 10-12-97 | 000 | 47.09 | 11-01-97 | 000000 | 000000 | 000000 |
| A | B | C | D | E | F | G | H | I |

FIG. 2
11-4-97
ACME AUTO SERVICE
EMPLOYEE RECORD

| | EMPLOYEE NUMBER | NAME | DEPARTMENT | OFFICE | TELEPHONE NUMBER | E-MAIL |
|---|---|---|---|---|---|---|
| (S1) | 01897 | JONES, JOHN | 46 | NEWARK | 201-494-1109 | JONES@NEWARK |
| (S2) | SS: | 123-45-6789 | | | | |
| (S3) | SALARY: | 15,280.00 | | | | |
| (S4) | HOME: | 53 COW PATH, NEWARK, NJ 45678, 201-489-1473 | | | | |

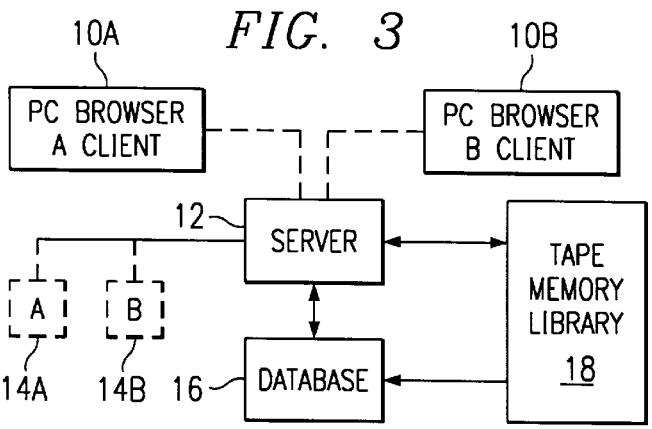
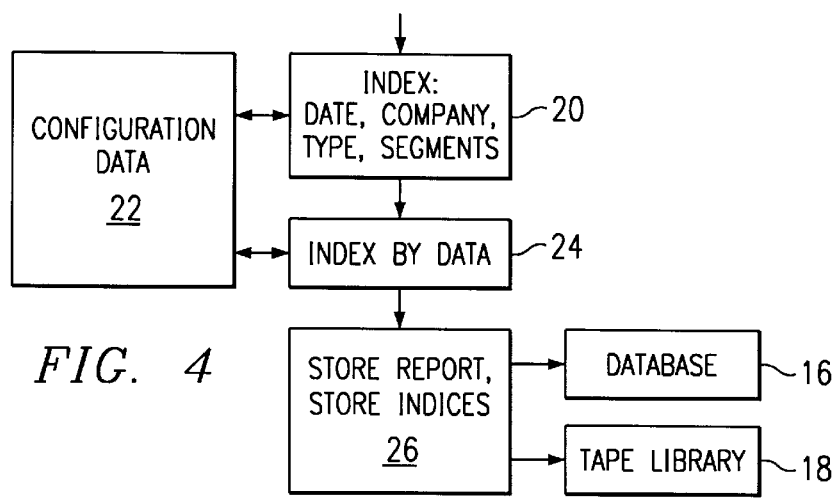
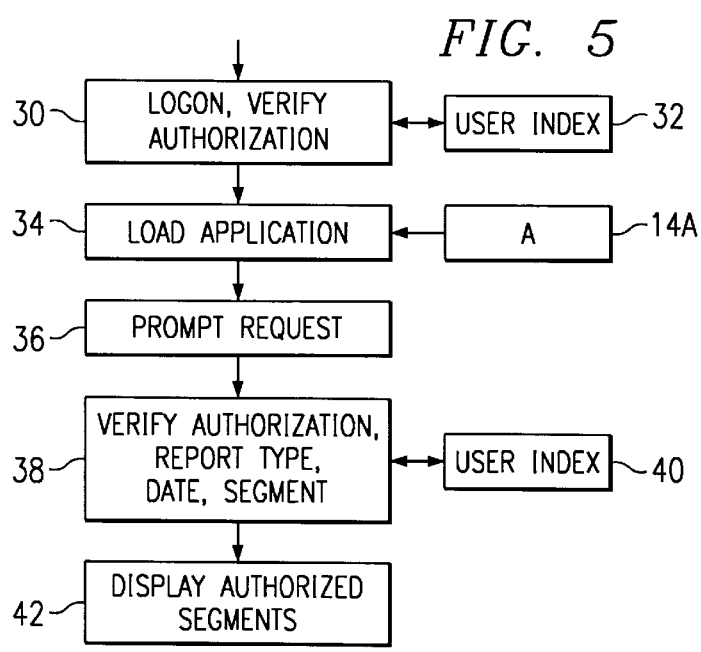

REPORT DATABASE SYSTEM

TECHNICAL FIELD OF THE INVENTION

The present invention relates to computer databases and particularly to databases in a shared-resource service bureau environment. In particular, the invention relates to the indexing, storage and retrieval of report data by a customer of a service bureau in an efficient online manner.

BACKGROUND OF THE INVENTION

In a service bureau environment, wherein a computer service bureau provider provides data processing functions for a plurality of customers, customer transaction reports are frequently generated periodically, and in many cases daily. Such reports can be delivered to the client over a datalink to a printer at the client facility, whereat the reports are printed out in hard copy. Alternatively, the reports can be produced using, for example, a microfilm printer wherein the client is provided with microfilm copies of the report. Having the report in either hard copy or microfilm medium is inefficient in the sense that a client must often manually search for particular data in a report, which is possibly hundreds or even thousands of pages in length.

SUMMARY OF THE INVENTION

In accordance with the invention there is provided a method for storing and indexing reports in a computer database. The method includes providing report data in a predetermined report configuration and storing the report data in selected memory locations in a database. Data elements of the same data parameter are identified in the report data in accordance with the arrangements of the data in the predetermined report configuration. The identified data elements are indexed in a data index which relates the data elements to corresponding memory locations in the database. The index is stored for access by a user to locate data elements.

In order to access particular desired data, a user can access the index using a specified data item of a specified data parameter to retrieve a database location corresponding to the specified data item and access the database to retrieve at least a portion of the report including the specified data item.

In accordance with the invention, there is provided a method for controlling access by a user to report data in a computer database. The method includes identifying a report type, a report date and one or more report segments for each report stored in the database. A user identification is provided for each user having access to the database. An authorization index is provided which associates each user identification with authorized report types, authorized report dates, and authorized report segments for each authorized report type. When database access requests are received, the requests include an entered user identification, an entered report type and an entered report date. The system provides report data in response to access requests only if the entered user identification is associated in the authorization index with an authorized report type corresponding to the entered report type, and is associated with an authorized report date corresponding to the entered report date. Further, report data is provided only for report segments corresponding to authorized report segments associated in the authorization index with the entered user identification.

The access control method of the invention is advantageously applied in a service bureau environment wherein reports are stored in a database, which further associates a customer with each report. The authorization index additionally identifies customers whose data a user is authorized to access. The report data is provided to the user only if the entered user identification is associated in the authorization index with the customer identified with respect to a requested report.

In accordance with a further aspect of the invention there is provided a method for storing and retrieving data in a computer database. The method includes providing a first server for processing data requests from users. Selected current data is stored in a current database operated as a second server which is accessed by the first server. All data is stored in a data library which is in communication with the first server and the second server. The first server is operated to access the current data in the second server in response to requests for current data. In response to requests for other-than-current data, the first server is caused to access the data library to cause the requested other-than-current data to be transferred from the data library to the second server, thereafter the first server operates to access the second server to obtain selected portions of the transferred other-than-current data.

It is therefore an object of the invention to provide a method for storing and indexing periodic reports in a computer database wherein reports are available for viewing and/or full or partial printing by online access to the database and wherein the content of the report can be searched through an index to locate transactions concerning which the client needs information.

In accordance with another aspect, in providing such reports to employees of a service bureau customer, it is an object of the invention to limit not only the reports to which a particular employee has access for purposes of his or her duties, but in some cases, to provide access only to portions of a report on the basis of the authorization of a particular employee. It is therefore an object of the invention to provide a method for controlling access by a user to report data in a database and particularly to control access to such reports in a service bureau database.

In connection with another aspect, it is an object of the invention to store more frequently accessed current report data in a manner that can be easily accessed online. Less current data also needs to be accessed from time to time. It is therefore desirable to provide a system for storing current data for immediate access and other-than-current data for online access upon request by a user or a customer of a service bureau.

For a better understanding of the present invention, together with other and further objects, reference is made to the following description, taken in conjunction with the accompanying drawings and its scope will be pointed in the appended claims.

BRIEF DESCRIPTION OF THE DRAWINGS

FIG. 1 is an exemplary computer-generated report illustrating a report configuration.

FIG. 2 is a further exemplary computer-generated report illustrating report segments.

FIG. 3 is a block diagram illustrating the arrangement for a service bureau report storage and retrieval system in accordance with the present invention.

FIG. 4 is a flow diagram illustrating report indexing according to the present invention.

FIG. 5 is a flow diagram illustrating report access control according to the present invention.

DETAILED DESCRIPTION OF THE INVENTION

In connection with processing data for its clients, a service bureau corporation periodically generates reports, concerning financial and possibly other information. These reports are generally formatted in columns and rows of report data. FIG. 1 is an example of a report which includes header segment information indicating a report date, the name of the company and the type of report. The report, following a pre-determined report configuration, includes reference numbers and other data, arranged in columns of data of a common data parameter. The exemplary report illustrated partially in FIG. 1 is an accounts payable report. Following a predetermined configuration, identification data is provided as header segments of the report to indicate report, customer name and report type. This FIG. 1 report is generated by a service bureau corporation for a customer, Planetary Gear Company. The heading, "Accounts Payable" identifies the type of report. It is normal for such reports to follow a predefined configuration of data, for example, having the data arranged in rows and columns, wherein columns constitute the data elements of a specified data parameter, which is identified by the heading of each column.

Typically reports, of the general type illustrated in FIG. 1, are prepared for output to a printer with the data arranged in rows as shown in FIG. 1 which includes data columns A through I, each column relating to a different data parameter. The data elements in each column constitute data elements of the specified data parameter indicated at the head of the column.

The inventors have taken advantage of the columnar data arrangement usually provided as a predetermined configuration for such reports for purposes of generating an index whereby data of interest can be automatically accessed by a system user. For example, in the event a user of the system wants to determine the status of an account payable item for a particular vendor, by searching the index for that vendor all data items related to that vendor can be identified by storage location in a database memory, and those portions can be conveniently retrieved and displayed to the system user.

Accordingly, according to one aspect of the present invention, a report is provided to a data storage system in a predetermined report configuration, the report is stored in a database at selected memory address locations, e.g. in a disc memory. Concurrent with report storage, data elements in the report are identified as being representative of selected data parameters, and an index of the data elements referencing report storage location is generated. It is not necessary, although it is possible, to index all of the data parameters in a particular report. By thus generating and storing indices at the time the report is stored, portions of the report which are of interest to a system user can be conveniently retrieved by using the index.

In addition to indexing the various data parameters in the report, the report is stored with reference to header segments, including the date of the report, the title of the report, and in a service bureau environment, the customer for whom the report is prepared and stored. As will be further described, these elements of the report are useful in controlling access.

FIG. 2 is an example of a further report, wherein the report is divided into report segments for purposes of controlling access to specific data in the report. In connection with the FIG. 2 report, there is provided a report date, a report title, and where appropriate, the name of the company for which the report is prepared. The FIG. 2 report is a record of employees of the company, and as such, contains information which is not to be available to all users who have access to the system. As indicated in parentheses on the left side by the numbers S1, S2, S3, and S4, the FIG. 2 report is divided into report segments, and access to the report segments is controlled by the system of the present invention. As an example, the segment label S1 of the FIG. 2 report gives the name, employee number, department, office, telephone extensions number and E-mail address of John Jones. Segment S2 of the report lists his social security number; Segment S3 lists his salary; and Segment S4 lists his home address. In connection with access to reports using the system of the present invention, most system users might have access to the first segment, and other users would have access to the remaining segment only according to their particular job function. For example, the payroll department would need to have access to the employee's name, social security number and salary. On the other hand, the security department would require access to his name and other data in Segment S1 and to the home address and telephone number, as set forth in Segment S4, but would not need access to his social security number or his salary. In accordance with the present invention, by dividing the report in to segments, access to the report can be controlled automatically according the authorization given to any particular system user.

FIG. 3 is a block diagram illustrating the arrangement of a system according to the present invention for providing access to reports by customers of a service bureau. Those skilled in the art will recognize that the system of FIG. 3 can also be used to provide internal access to report data within a single corporate entity, such as a hospital or a business. An authorized user, such as an employee of a customer of a service bureau, operates a browser program on a personal computer or the like, as represented by computers 10-A and 10-B in FIG. 3, to access a Server 12 which may provide online report service to a plurality of users. Server 12 is provided with customer-specific program packages 14-A, 14-B, etc. which provide specific access display screens and information specific to the identification and configuration of reports stored on behalf of a customer. Server 12 provides customer specific user interface screens and also controls access by the users to the database, and security for the database in connection with only allowing authorized users to have access to data. In addition, Server 12 provides interface screens for purposes of requesting and receiving entry of information concerning stored report data which a user may be seeking to access. Accordingly, the browser programs provided to clients 10A and 10B are simple programs, such as commonly used to search the Internet. When Server 12 receives a request from a user for access to a report, the server calls up authorization information from database 16 to determine whether the user, who has previously entered a user identification number for purposes of logon, is authorized to have access to the report data requested. Specifically, report access is controlled on a user-by-user basis, on the basis of report type, report date, and report segment. In addition, reports are only provided to users in a service bureau environment, where users are identified as being authorized to have access to data relating to a particular customer. When Server 12 determines the authorization of the user to have access to report data, the server pulls the report data from the database 16. In this process the user may be prompted to request data in a number of ways, for example, the user might ask to see a particular page of the report. Alternately, the user may request to view the first and then subsequent pages of the report. In accordance with the invention, the user also is able to access the report using the indices which are generated by reference to the data in the report. Thus, a user can elect to search a report to locate and display or print report portions which have a specified data item in a specified data parameter. For example, if the report is an accounts payable report, as in FIG. 1, the user may select an index, for example a vendor index, as prompted on a user interface screen and search for data related to a particular vendor. Server 12, after receiving the request for an index search, will consult the index stored on database 16, determine the memory location of the report portions which are identified in the index search, and provide those portions to the user by a communications link.

The data storage and retrieval system illustrated in FIG. 3 is designed to receive massive quantities of reports on a daily basis. The reports will be stored, e.g. in disc memory in database 16, for ready online access for a selected current time period, for example, six months. After the current time period has expired, the usefulness of such reports is reduced considerably and the reports may thereafter be accessed only from a tape memory library which has a greater number of reports and a large amount of data, but has a relatively slow access time. In the event a user requests access to a report that is not in the current report database 16, the user will be queried as to whether the report should be accessed from the tape memory library 18, at an extra charge to the user. If the user authorizes the access charge, and the user holds an authorization to access other-than-current files, for example by date limitation in the authorization index, the server will advise the user of a time, such as one hour later, when the report will be available. The Server 12 then accesses tape memory library 18, causing the tape memory library to access the requested report and load the requested report for a temporary period into database 16. At a later time, when the user again accesses Server 12 and requests the other-than-current report data, it is available for access in database 16.

Database 16 can be arranged to overwrite such retrieved other-than-current data after a selected period, such as one or two weeks.

Referring to FIG. 4, there is illustrated a flowchart for a program for storing data in database 16 and tape memory library 18. A report is provided to database processor 16 in printer format, wherein the data is arranged according to a report configuration, such that the data parameter for any item of data in the report can be identified by the printer configuration location of the data item. When the report is initially received at step 20, it is indexed by the header segments, including date, company, report type and segments. The system appropriately refers to configuration data 22, which is provided for each corporate customer of the service bureau, which identifies the configuration of the reports and the report types provided for that company. The configuration data 22 is additionally used in the process of generating data indices at step 24 wherein particular data elements are provided to indices according to the data parameters they represent, using the location of the data elements in the printer data and configuration data 22. The report and the indices generated are stored on both database 16 and tape memory library 18. Report storage can use any appropriate database management system, such as Oracle DBMS. The storage on database 16 is maintained for a current report period, for example, six months. The entire database is maintained on tape library 18, including both current report data and other-than-current report data. Tape library 18 further acts as a backup to database 16 in the event malfunction in database 16 causes a loss of current data stored therein, and also provides archival storage and access as described above.

Referring to FIG. 5, there is shown a flow diagram for access by an authorized user to report data in accordance with the present invention. In Step 30, the user logs onto the system using a browser program in a personal computer 10 and enters an authorization number which is verified by Server 12 by reference to the user index 32. Once the user has been identified and is associated with a particular customer of the service bureau, the Server 12 loads an application at step 34, such as application 14A, which is specific to the customer with whom the user is associated and authorized to access reports. The particular application 14A then runs on Server 12 and prompts the user to make a request for report data at step 36. The user will enter a report request by entering a report type and report date, and possibly a report segment which he wishes to view. The user may be further prompted as to which portion of the report he decides to view, such as viewing the first page, the twenty-first page, or accessing the report through an index. In the event the user chooses to access the report by use of one of the indices generated using the process of FIG. 4, his index search is verified for authorization using the user index 40 at step 38. Thereafter, the Server 12 retrieves the report portions requested from database 16 and displays those portions, provided the user is authorized on user index 40 to have access to view the particular report and the requested portions. If the user, for example, requests general viewing of a report, the report will be displayed only insofar as the segments to which the user has authorization. Using the report of FIG. 2 as an example, a user who has only authorization to view Segment S1 of the employee record would see on his screen only that portion of the report and would not receive the remaining segments S2 through S4.

While there has been described what is believed to be the preferred embodiment of the present invention, those skilled in the art will recognize that other and further modifications may be made thereto without departing from the spirit of the present invention, and is intended to claim all such changes and modifications as fall within the true scope of the invention.

We claim:

1. A method for storing and indexing reports in a computer database, comprising:

providing report data in a predetermined report configuration wherein data elements are arranged at locations in said report data corresponding to the data parameter represented by said data elements;

storing said report data in selected memory locations in said database;

identifying data elements of the same data parameter in said report data in accordance with said arrangement of said data in said predetermined report configuration;

indexing said identified data elements in a data index relating said data elements to the memory location thereof in said database; and storing said index.

2. A method as specified in claim 1 wherein said report includes data elements for a plurality of data parameters, wherein data elements are identified for more than one of said data parameters, and wherein said data elements are arranged in a separate index for each said data parameter for which data elements are identified.

3. A method for storing and retrieving report data in a computer database, comprising:

providing report data in a predetermined report configuration wherein data elements are arranged at locations in said report data corresponding to the data parameter represented by said data elements;

storing said report data at selected memory locations in said database;

identifying data elements of the same data parameter in said report data in accordance with said arrangement of said data in said predetermined report configuration;

indexing said identified data elements in a data index relating said data elements to the memory location thereof in said database;

storing said index;

accessing said index using a specified data item of a specified data parameter, thereby to retrieve a database location corresponding to said specified data item; and accessing said database to retrieve at least a portion of said report data including said specified data item.

4. A method as specified in claim 3 wherein said report includes data elements for a plurality of data parameters, wherein data elements are identified for more than one of said data parameters, and wherein said data elements are arranged in a separate index for each said data parameter for which data elements are identified.

5. A method for controlling access by a user to report data in a computer database, comprising:

for each report in said database identifying a report type, a report date and one or more report segments;

for each user having access to said database providing a user identification;

providing an authorization index associating each said user identification with authorized report types, authorized report dates and authorized report segments for each authorized report type;

receiving database access requests, said access requests including an entered user identification, an entered report type and an entered report date; and providing report data in response to an access request only if said entered user identification is associated in said authorization index with an authorized report type corresponding to said entered report type and with an authorized report date corresponding to said entered report date, said report data being provided only for report segments corresponding to authorized report segments associated in said authorization index with said entered user identification.

6. A method for controlling access by a user to report data in a service bureau computer database having report data for a plurality of service bureau customers, comprising:

for each report in said database identifying a customer, a report type, a report date and one or more report segments;

for each user having access to said database providing a user identification;

providing an authorization index in said database associating each said user identification with at least one customer, at least one authorized report type, authorized report dates and authorized report segments for each report type;

receiving database access requests, said access requests including an entered user identification, an entered report type and an entered report date; and providing report data in response to an access request only if said entered user identification is associated in said authorization index with the customer identified with respect to said report, with an authorized report type corresponding to said entered report type and with an authorized report date corresponding to said entered report date, said report data being provided only for report segments associated in said authorized index with said entered user identification.

7. A method as specified in claim 6 wherein said authorization index associates at least one said user identification with all said report types, report dates and report segments for each customer.

8. A method for storing and retrieving data in a computer database, comprising:

providing a first server for processing data requests from users;

storing selected current data in a current database operating as a second server which is accessed by said first server;

storing all data in a data library, said data library being in communication with said first server and said second server;

operating said first server to access said current data in said second server in response to requests for current data;

operating said first server to access said data library in response to requests for other-than-current data, thereby to cause said other-than-current data to be transferred from said data library to said second server; and operating said first server to access said second server to obtain selected portions of said transferred other-than-current data.

* * * * *